B. NAGY.
FEEDING ATTACHMENT FOR CROWN CORK MAKING MACHINES.
APPLICATION FILED JAN. 11, 1913.
1,063,720.  Patented June 3, 1913.
2 SHEETS—SHEET 2.
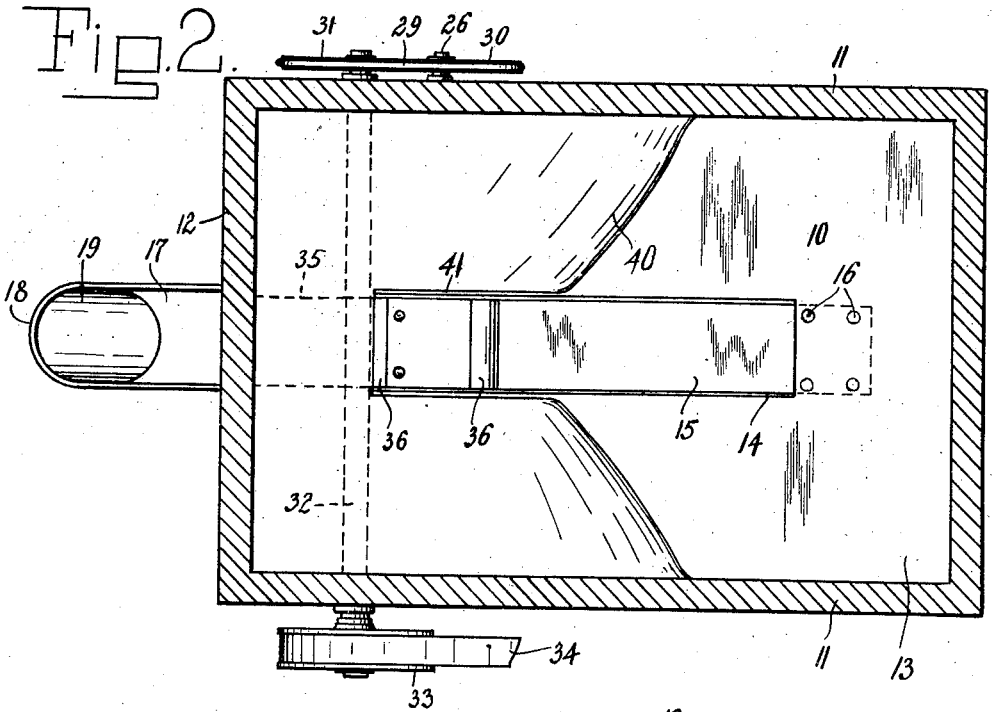
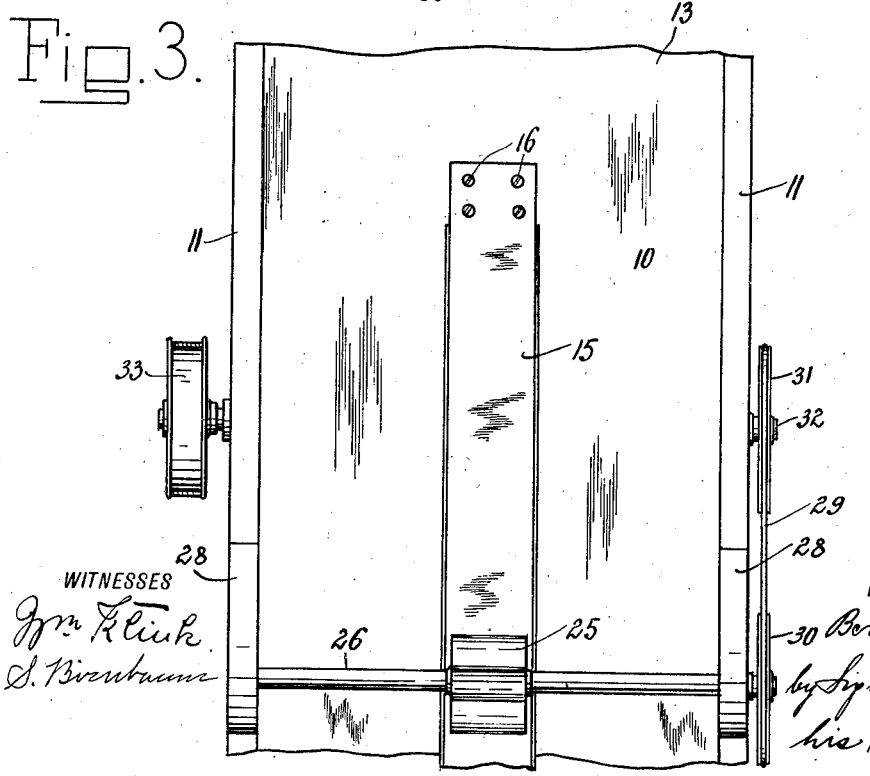

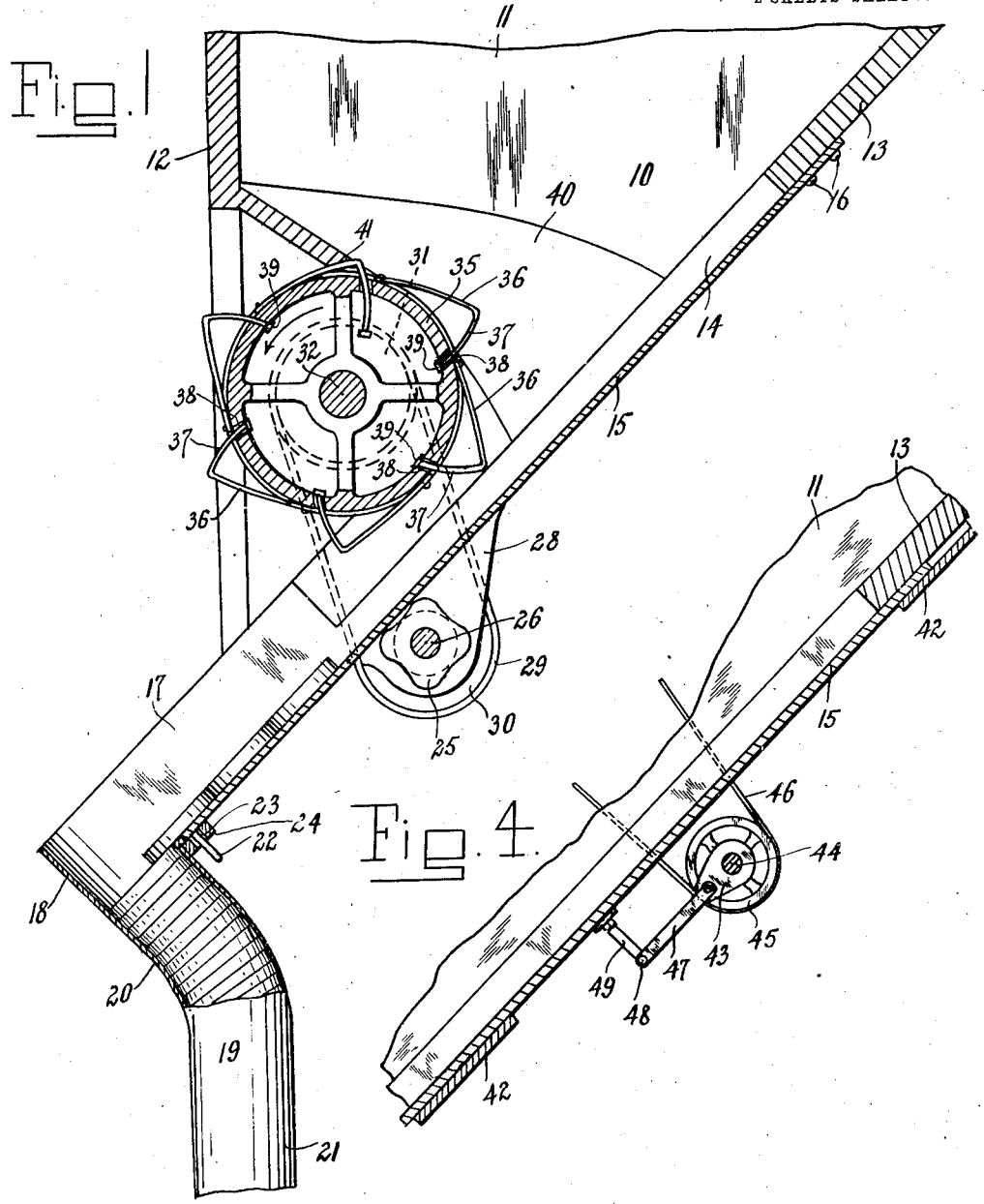

UNITED STATES PATENT OFFICE.

BERTHOLD NAGY, OF NEW YORK, N. Y.

FEEDING ATTACHMENT FOR CROWN-CORK-MAKING MACHINES.

1,063,720.   Specification of Letters Patent.   Patented June 3, 1913.

Application filed January 11, 1913. Serial No. 741,490.

*To all whom it may concern:*

Be it known that I, BERTHOLD NAGY, a subject of the King of Hungary, and resident of the city of New York, in the county of Kings and State of New York, have invented certain new and useful Improvements in Feeding Attachments for Crown-Cork-Making Machines, of which the following is a specification.

The present invention relates to an attachment to machines for manufacturing bottle closures of the class known as "crown cork sealing caps or closures," and more particularly to means for feeding the sealing disks of cork or similar material of the closures to the assembling devices of the machine.

In feeding sealing disks of cork or the like to assembling machines, many difficulties have been experienced owing to the fact that, first, such disks vary in their thicknesses to some extent, second, they are very light in weight, and third, they are apt to take a curved or bent shape when being prepared or treated before they are brought upon the assembling machine.

One of the objects of the present invention is to provide a simple and efficient feeding attachment which automatically delivers the sealing disks from a mass to an assembling machine without regard to their thicknesses, weight and more or less curved shapes.

With these and other objects in view, which will more fully appear as the nature of the invention is better understood, the same consists in the combination, arrangement and construction of parts hereinafter fully described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

Two of the many possible embodiments of the invention are illustrated in the accompanying drawings, in which:—

Figure 1 is a central vertical section taken through a hopper provided with a feed chute constructed in accordance with the present invention in its preferred form; Fig. 2 is a plan view thereof; Fig. 3 is a rear elevation of the same; and Fig. 4 is a central vertical section taken through a modified detail of construction.

Referring now more particularly to Figs. 1 to 3, inclusive, the numeral 10 indicates a hopper, comprising sides 11, a front wall 12 and an inclined base 13. In this base is formed an inclined guiding passage 14 of a width which is slightly larger than the diameter of a sealing disk, the bottom of this passage being formed by a resilient plate 15, which is attached by screws 16, or otherwise, to the base 13. The passage 14 leads to a chute 17, which is located in front of the hopper, and the bottom of which is formed by the plate 15. The closed front end 18 of the chute 17 is curved, the radius of its curvature being somewhat larger than the radius of a sealing disk of the closure. It will be observed from the drawings that the front end 18 of the chute is arranged substantially at right angles to the plane of the bottom 15 thereof, and as a continuation of said front portion is formed a tube 19, leading to the transporting means, which conveys the sealing disks one after the other to the assembling machine. The upper end 20 of this tube is inclined, preferably, to the same degree as the front portion 18, and merges into a substantially vertical section 21, which extends to the transporting means above mentioned. Upon the front end of the bottom 15 is held a pin 22, which is seated in an aperture 23 in a guide block 24, the latter being attached, preferably, to the tube 19. The bottom plate 15 is vibrated by any suitable means, for instance by a cam 25, which is fixedly attached to a spindle 26, rotatably mounted in lugs 28, that are formed upon the sides 11 of the hopper. Rotation is imparted to this cam, for instance, by means of a belt 29, running over a pulley 30, which is keyed or otherwise attached to the spindle 26, and over a pulley 31, which is secured to a shaft 32, the latter being journaled in the sides 11 of the hopper. The shaft 32 carries a driving pulley 33, which is actuated by a belt 34, receiving motion from any suitable means. Upon the shaft 32 is furthermore mounted a drum 35, the width of which corresponds to that of the passage. To the peripheral portion of this drum are fastened equi-distantly a plurality of leaf springs 36, also corresponding in width to that of the passage 14. These leaf springs extend outward from the peripheral portion of the drum, their free ends being provided with somewhat curved guiding plates 37, which extends through apertures 38 into the drum, and are provided within the drum with stops 39, normally abutting against the inner face of the drum. The drum is arranged within the hopper above and in alinement with the passage 14, rotates in the direction of the arrow indicated in Fig. 1 of the drawings, and is mounted relative to the bottom 15 of the passage 14 in such a manner that the free end of a spring, when in its nearest position with relation to the said bottom, is arranged at a distance from the upper surface of the bottom plate 15 which is equal to the thickness of a sealing disk plus the throw of the cam 25. Within the hopper is held furthermore an inclined plane 40, which serves to direct the sealing disks into the passage 14 and also toward the drum 35, this plane having a slot 41, through which the drum projects above the said plane.

The operation of this device is as follows: A mass of disks is placed into the hopper and rotation imparted by the intermediary of the driving pulley 33 to the drum 35, and thus to the cam 25. The rotating drum 35 agitates the disks, turns them repeatedly over and causes those at the bottom to move down the base 13 of the hopper, where they find their way into the guiding passage 14. Those disks which roll or slide down the base of the hopper edgewise are caused to remain within the hopper by the springs 36 of the drum. Those disks, however, which come to lie with one of their faces upon the bottom of the said passage, are moved along said passage toward the drum by the vibrating motion imparted to the bottom plate 15. If two or more disks on top of each other come within the reach of the drum 35, the springs will hold back all with the exception of the lowermost one, which is caused to slide, due to the vibrating motion of the bottom plate 15 toward the front 18 of the chute 17, where it is lowered by gravity into the tube 19, by which it is conveyed to the assembling machine. As soon as a spring 36 comes into contact with the upper edge of the slot 41 in the plane 40, it is forced by the said edge toward the periphery of the drum, its guide plate 37 being thereby lowered into the drum. As soon as a spring is disengaged from the said edge, it springs back into its normal position, the outward motion being limited by its stop 39.

The drum serves a two-fold purpose, that is as an agitating means, and at the same time as a gate controlling the admission of the sealing disks into the chute. The purpose of the cam 25 is to vibrate the bottom of the passage 14 and the chute 17, such vibration causing the disks to move toward the tube 19 irrespective of their weight.

From the foregoing it will be observed that a variation in the thicknesses of the disks does in no way affect the efficiency of the apparatus, neither does the fact that some of the disks might be bent or curved owing to their preparatory treatment. The weight of an individual disk does not enter into consideration inasmuch as the vibration of the bottom of the guiding passage and chute causes them to slide toward the tube 19, no matter what their weight be.

A modification of the invention is illustrated in Fig. 4 of the drawings, which differs from the preferred form hereinabove described in that the bottom plate 15 is reciprocated instead of being oscillated or vibrated. The plate 15 moves within guides 42, which serve at the same time to keep said bottom plate upon the hopper. The means for imparting reciprocating motion to the bottom plate includes a crank 43, which is attached to a spindle 44, the latter being driven by the intermediary of a pulley 45 and a belt 46 from the shaft 32 above described. To the crank is pivoted a link 47, the latter being fulcrumed at 48 to a lug 49, which is attached to the bottom plate 15. Otherwise the construction and operation of the device is identical with the one shown in Figs. 1 to 3, inclusive, of the drawings, the reciprocating motion of the bottom plate in this instance serving the same purpose as the oscillating or vibrating motion of the bottom plate shown in the device above described.

What I claim is:—

1. In a device of the character described, the combination with a hopper adapted to receive a mass of sealing disks of cork or the like having a discharge opening and an inclined passage leading to said opening, of a chute communicating with said passage, the bottom of said passage and said chute being formed by a movable plate, means for imparting a shaking motion to said plate, a drum mounted above and in alinement with said passage, and a plurality of springs on said drum, said springs serving to permit only those disks to enter said chute which slide on one of their faces in said passage toward said chute and at the same time to agitate the mass of disks in said hopper.

2. In a device of the character described, the combination with a hopper adapted to receive a mass of sealing disks of cork or the like having a discharge opening and an inclined passage leading to said opening, of a chute communicating with said passage, the bottom of said passage and said chute being formed by a movable plate, means for imparting a shaking motion to said plate, a drum mounted above and in alinement with said passage, and a plurality of springs on said drum, each spring when in its nearest position relative to the upper face of said movable plate being arranged at a distance so as to permit only such disks to enter said chute which slide on one of their faces in said passage toward said chute.

Signed at New York, in the county of New York and State of New York, this 4th day of January, A. D. 1913.

BERTHOLD NAGY.

Witnesses:
 SIGMUND HERZOG,
 M. FRIEDLANDER.